United States Patent
Weng

(10) Patent No.: US 12,092,071 B2
(45) Date of Patent: Sep. 17, 2024

(54) ROTOR FOR POWER DRIVING

(71) Applicant: Zhen-Guo Weng, Kaohsiung (TW)

(72) Inventor: Zhen-Guo Weng, Kaohsiung (TW)

( * ) Notice: Subject to any disclaimer, the term of this patent is extended or adjusted under 35 U.S.C. 154(b) by 0 days.

(21) Appl. No.: 17/669,583

(22) Filed: Feb. 11, 2022

(65) Prior Publication Data

US 2022/0163011 A1  May 26, 2022

Related U.S. Application Data

(63) Continuation-in-part of application No. 17/151,775, filed on Jan. 19, 2021, now Pat. No. 11,280,313,
(Continued)

(30) Foreign Application Priority Data

Feb. 1, 2019 (CN) .......................... 201910104976.6

(51) Int. Cl.
*F03D 1/06* (2006.01)
*F03B 13/00* (2006.01)
*F03D 9/25* (2016.01)

(52) U.S. Cl.
CPC .............. *F03D 1/06* (2013.01); *F03B 13/00* (2013.01); *F03D 1/0602* (2023.08); *F03D 1/0625* (2013.01); *F03D 9/25* (2016.05)

(58) Field of Classification Search
CPC ........ F03D 3/002; F03D 3/067; F03D 1/0625; F03D 1/0666; F03D 1/0658; F03D 9/25;
(Continued)

(56) References Cited

U.S. PATENT DOCUMENTS 252,947 A * 1/1882 Jones et al. ............... F03D 3/00
  416/132 B
998,446 A * 7/1911 Amy ........................ B63H 1/24
  416/142
(Continued)

FOREIGN PATENT DOCUMENTS

CN  1721691 A  1/2006
CN  101737252 A  6/2010
(Continued)

OTHER PUBLICATIONS

Lee et al. KR 20100122064 Espacenet—English Machine Translation (Year: 2010).*

*Primary Examiner* — Justin D Seabe
*Assistant Examiner* — Wayne A Lambert
(74) *Attorney, Agent, or Firm* — Best & Flanagan LLP

(57) ABSTRACT

A rotor for power driving includes a hub, a plurality of first fixed jibs, a plurality of second fixed jibs, and a plurality of outer vanes. The hub is adapted to be coupled with a shaft to rotate together in a single rotational direction. The first fixed jibs are arranged around the hub circumferentially. Each second fixed jib is engaged on an end of a corresponding first fixed jib. Each outer vane is elastically fixed at a corresponding second fixed jib and extends in a direction different from the single rotation direction when not acted upon by external forces such that the plurality of outer vanes, when acted upon by external forces, are elastically movable relative to corresponding second fixed jibs to drive the shaft to rotate along the single rotational direction and can rebound after removal of the external forces.

10 Claims, 19 Drawing Sheets

Related U.S. Application Data which is a continuation of application No. PCT/CN2019/080711, filed on Apr. 1, 2019.

(58) Field of Classification Search
CPC .... F03D 1/06; F03D 1/0602; F05B 2240/218; F05B 2240/221; F05B 2240/2211; F05B 2240/2212; F05B 2210/16; F03B 17/065; F03B 13/00
See application file for complete search history.

(56) References Cited

U.S. PATENT DOCUMENTS

| | | | |
|---|---|---|---|
| 1,511,965 A | 10/1924 | Hennigh | |
| 3,995,170 A * | 11/1976 | Graybill | F03D 3/067 290/55 |
| 4,086,023 A * | 4/1978 | Morgan | F03D 3/067 416/241 A |
| 4,377,372 A * | 3/1983 | Stutzman | F03D 3/067 416/197 A |
| 4,383,797 A * | 5/1983 | Lee | F03B 17/062 415/906 |
| 4,424,451 A * | 1/1984 | Schmidt | F03B 17/065 416/107 |
| 4,533,297 A | 8/1985 | Bassett | |
| 4,776,762 A * | 10/1988 | Blowers, Sr. | F03D 3/068 416/17 |
| 5,051,059 A * | 9/1991 | Rademacher | F03D 3/067 416/85 |
| 6,006,518 A * | 12/1999 | Geary | F03B 17/065 60/398 |
| 6,069,409 A * | 5/2000 | Fowler | F03D 3/002 290/55 |
| 6,499,939 B2 * | 12/2002 | Downing | F03B 17/065 416/119 |
| 7,591,635 B2 * | 9/2009 | Ryu | F03D 3/068 416/111 |
| 8,035,245 B1 | 10/2011 | Simnacher | |
| 8,414,266 B2 | 4/2013 | Lam et al. | |
| 8,419,367 B2 * | 4/2013 | Fite | F03D 3/067 416/204 R |
| 9,866,094 B2 | 1/2018 | Huang | |
| 10,400,747 B2 * | 9/2019 | Guignard | F03B 13/10 |
| 2004/0164561 A1 | 8/2004 | Nagawa et al. | |
| 2005/0074323 A1 | 4/2005 | Chio | |
| 2008/0292460 A1 | 11/2008 | Kuo et al. | |
| 2009/0035135 A1 | 2/2009 | Martinez Penades | |
| 2009/0110554 A1 * | 4/2009 | Dukovic | F03D 3/06 416/223 R |
| 2009/0169382 A1 | 7/2009 | Bond | |
| 2009/0180880 A1 * | 7/2009 | Ersoy | F03D 3/067 416/132 R |
| 2009/0297347 A1 | 12/2009 | Burr et al. | |
| 2010/0232960 A1 | 9/2010 | Larsen | |
| 2011/0250069 A1 * | 10/2011 | Quintal | F03D 3/002 416/111 |
| 2011/0255954 A1 | 10/2011 | Chen | |
| 2012/0134823 A1 * | 5/2012 | Tully | F03D 1/0633 416/131 |
| 2012/0189446 A1 | 7/2012 | Saarem | |
| 2012/0207601 A1 | 8/2012 | Wang | |
| 2017/0009736 A1 * | 1/2017 | Behrens | F03D 3/005 |
| 2017/0211544 A1 | 7/2017 | Olivera | |
| 2017/0260964 A1 * | 9/2017 | Huang | F03D 3/002 |
| 2018/0051673 A1 * | 2/2018 | Huang | F03D 3/061 |

FOREIGN PATENT DOCUMENTS

| | | | |
|---|---|---|---|
| CN | 201599137 U | 10/2010 | |
| CN | 202510288 U | 10/2012 | |
| JP | 61028767 A * | 2/1986 | |
| JP | 3204736 U * | 6/2016 | F03D 1/00 |
| KR | 20100122064 A * | 11/2010 | |
| KR | 20110081485 A * | 7/2011 | |
| WO | WO-2004025117 A2 * | 3/2004 | F03D 3/002 |
| WO | WO-2009044386 A1 * | 4/2009 | F03D 3/067 |
| WO | WO-2011083888 A1 * | 7/2011 | F03D 3/062 |

* cited by examiner

ROTOR FOR POWER DRIVING

CROSS REFERENCE TO RELATED APPLICATION

This is a continuation-in-part application of U.S. patent application Ser. No. 17/151,775 filed on Jan. 19, 2021, which a continuation application of and claims priority to PCT/CN2019/080711 filed on Apr. 1, 2019, which claims priority to China Patent Application No. CN201910104976 filed on Feb. 1, 2019, the entire content of which is hereby incorporated by reference.

BACKGROUND OF THE INVENTION

1. Field of the Invention

The present invention relates to a rotor for power driving and, more particularly, to a mechanical rotor for power driving based on fluids such as winds, water flows or tides as driving sources.

2. Description of the Related Art

An electric generator driven by winds, water flows or tides usually consists of a rotor, a transmission system, a power generation system, and a tower pillar. The rotor is installed on a shaft and includes vanes on which fluids (gaseous or liquid) act. With vanes sustaining forces of airflows, the rotor rotates around the shaft for energy conversion from wind energy to mechanical energy which will be transferred to the power generation system through the acceleratory transmission system for generation of useful electric energy. Moreover, based on a rotor rotating around a shaft and matching a transmission system, there is a kind of windmill that is competent in running irrigation equipment or a grain husker.

A traditional rotor includes a hub mounted on a shaft, a plurality of holders arranged on the hub radially, and at least one moveable vane as well as at least one barrier member, both of which are installed on each holder. The movable vane is rotatable relative to the holder, and the barrier member restricts a rotary movement of the moveable vane at a specific angle. When the moveable vane on which winds act rotates a default angle and contacts the barrier member, the moveable vane creates resistance to air flows, so that the rotor rotates around the shaft. However, the moveable vanes easily worn after wind-induced rotary movements relative to the holders need to be maintained or repaired frequently and are denounced for its short service life. Additionally, the traditional rotor is made up of a relatively large number of parts, and hence has a complicated structure, time-consuming assembly, and relatively high cost.

BRIEF SUMMARY OF THE INVENTION

Thus, an objective of the present invention is to provide a rotor for power driving which is characteristic of fixed elastic vanes for a simplified structure and a better service life.

To achieve this and other objectives, a rotor for power driving in accordance with an embodiment of the present invention includes a hub, a plurality of first fixed jibs, a plurality of second fixed jibs, and a plurality of outer vanes. The hub is adapted to be coupled with a shaft to rotate together in a single rotational direction. The plurality of first fixed jibs is installed around the hub circumferentially and spaced from one another. Each of the plurality of first fixed jibs includes a first end connected to the hub and a second end kept away from the hub. Each second fixed jib is engaged on the second end of one of the plurality of first fixed jibs and arranged according to an axial direction of the shaft. Each outer vane is elastically fixed at a corresponding second fixed jib and extends in a direction different from the single rotation direction when not acted upon by external forces such that the plurality of outer vanes, when acted upon by external forces, are respectively elastically movable relative to the plurality of second fixed jibs to drive the shaft to rotate along the single rotational direction and can rebound after removal of the external forces.

In an embodiment, the outer vane is made of an elastic material and has one side connected to the corresponding second fixed jib such that the plurality of outer vanes on which the external forces act make no rotary movement relative to the plurality of second fixed jibs but are bent.

In an embodiment, the outer vane is made of a rigid material, and an elastic connecting member is installed between the outer vane and the corresponding second fixed jib. The elastic connecting member has an internal end connected to the corresponding second fixed jib and an external end connected to the outer vane.

In an embodiment, the outer vane is made of a rigid material, and at least one spring is installed between the outer vane and the corresponding second fixed jib. Two ends of the spring respectively abut against the corresponding second fixed jib and the outer vane, so that the outer vane is elastically movable relative to the corresponding second fixed jib when acted upon by external forces.

In an embodiment, each second fixed jib extends in a direction parallel to the axial direction of the shaft.

In an embodiment, each second fixed jib extends in a direction which is at an angle with respect to the axial direction of the shaft.

In an embodiment, each outer vane extends in a direction perpendicular to a radial direction of the shaft.

A rotor for power driving in accordance with another embodiment of the present invention includes two spaced hubs, a plurality of second fixed jibs, and a plurality of outer vanes. The hubs are adapted to be coupled with a shaft to rotate together in a single rotational direction, and the shaft extends through the two hubs. A plurality of first fixed jibs is installed around each hub circumferentially and spaced from one another. Each first fixed jib includes a first end connected to a corresponding hub and a second end kept away from the corresponding hub. Each second fixed jib is fixedly combined between two opposing first fixed jibs of the two hubs. Each outer vane is elastically fixed at a corresponding second fixed jib and extends in a direction different from the single rotation direction when not acted upon by external forces such that the plurality of outer vanes, when acted upon by external forces, are respectively elastically movable relative to the plurality of second fixed jibs to drive the shaft to rotate along the single rotational direction and can rebound after removal of the external forces.

In an embodiment, a ring is combined with the second ends of the first fixed jibs of each hub to form a bracket, and the plurality of second fixed jibs is fixedly combined between the two brackets and equiangularly distributed around the shaft.

In an embodiment, each outer vane has a first side connected to the corresponding second fixed jib and a second side kept away from the corresponding second fixed jib. A reference plane is formed between the first side of each outer vane and an axis of the shaft, and each outer vane is approximately perpendicular to the reference surface.

The present invention will become clearer in light of the following detailed description of illustrative embodiments of this invention described in connection with the drawings.

DESCRIPTION OF THE DRAWINGS

The illustrative embodiments may best be described by reference to the accompanying drawings where.

DETAILED DESCRIPTION OF THE INVENTION

Figure 1:
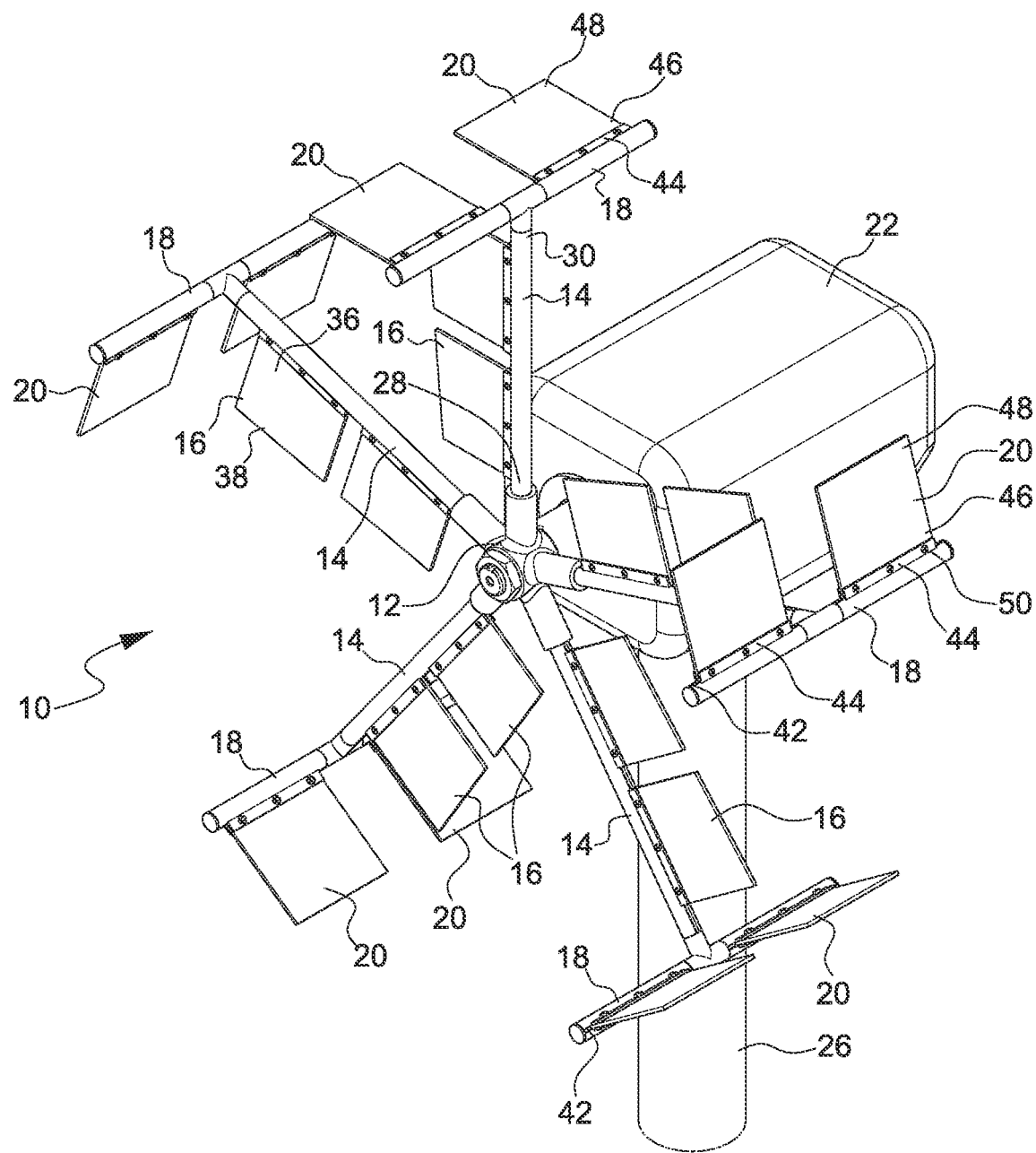
FIG. 1 is a perspective view of a rotor in accordance with a first embodiment of the present invention, with the rotor assembled with a shaft of a wind-driven electric generator.
Figure 2:
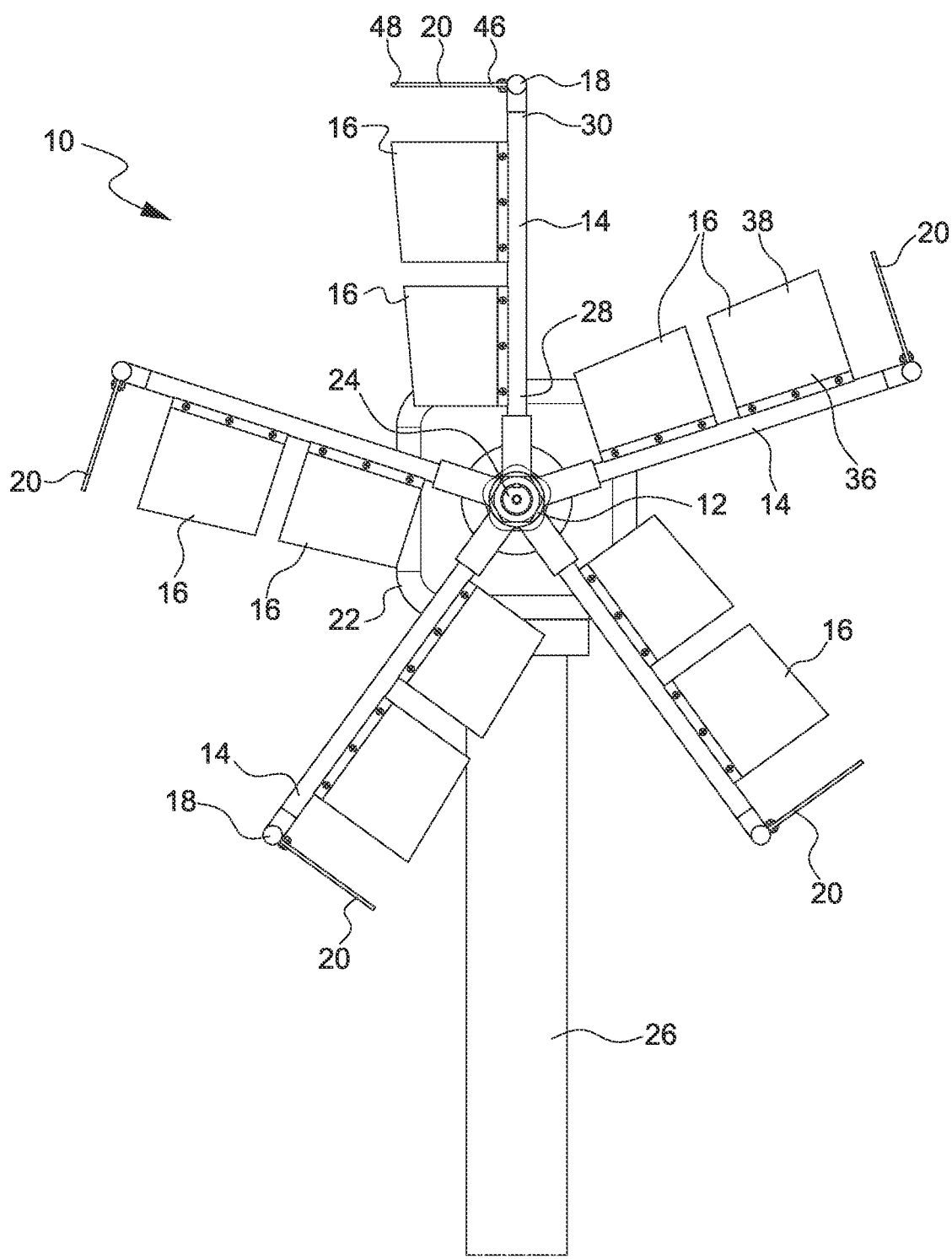
FIG. 2 is a plane view of the rotor and the electric generator in FIG. 1.
Figure 3:
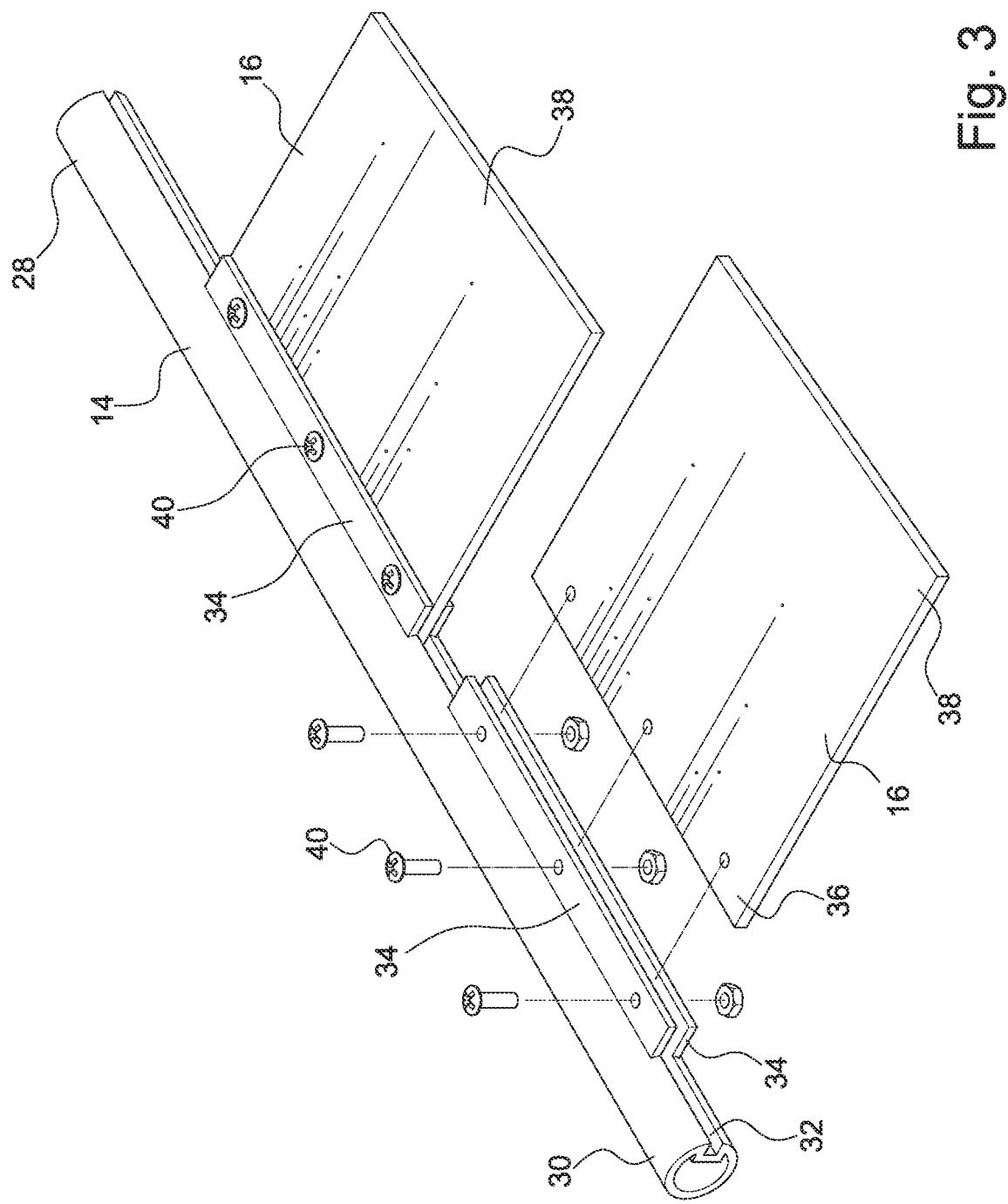
FIG. 3 is an exploded, schematic view for a first fixed jib and inner vanes of the rotor in FIG. 1.

A rotor 10 for power driving according to a first embodiment of the present invention is shown in FIGS. 1 through 3 of the drawings and is created for applications in fluids such as airflows (winds), water flows and tides, so that kinetic energies of fluids can drive the rotor 10 to rotate and further an appliance (for example, irrigation equipment or grain husker) to run or can be transmitted to a power generation system for electricity generation.

In this embodiment, a power generation system is demonstrated particularly. The rotor 10 includes a hub 12, a plurality of first fixed jibs 14, at least one inner vane 16 mounted on each first fixed jib 14, a plurality of second fixed jibs 18, and at least one outer vane 20 mounted on each second fixed jib 18. The hub 12 is adapted to be coupled with a shaft 24 of an electric generator 22 to rotate therewith. The electric generator 22 is supported on a tower pillar 26 such that the center of rotation of the rotor 10 is kept at a certain level. The shaft 24 of the electric generator 22 can be arranged horizontally as shown in FIG. 2. The shaft 24 can also be arranged vertically due to the design of the electric generator 22. The electric generator 22 is known to people skilled in the art in structure and can be replaced by another power unit. Thus, the electric generator 22 is excluded from technical specialties and not discussed in the present invention.

In this embodiment, the rotor 10 includes five first fixed jibs 14 and five second fixed jibs 18. In a feasible embodiment, the rotor 10 includes three, four, or more than five first and second fixed jibs 14 and 18. The five first fixed jibs 14 are installed around the hub 12 and spaced apart along a circumferential direction of the hub 12. Each first fixed jib 14 extends in a radial direction perpendicular to an axial direction of the shaft 24 and includes a first end 28 connected to the hub 12 and a second end 30 kept away from the huh 12. Each first fixed jib 14 is a cylindrical pole made of a rigid material. A groove 32 is formed in an outer surface of each first fixed jib 14 and extends in a lengthwise direction of the first fixed jib 14 (the radial direction mentioned previously). In this embodiment, the outer surface of each first fixed jib 14 is further provided with two pairs of clamp portions 34 spaced from each other. Each pair of clamp portions 34 protrudes outwardly from the outer surface of the first fixed jib 14 and are separated by the groove 32.

In this embodiment, two spaced inner vanes 16 are mounted on each first fixed jib 14, and each of the inner vanes 16 is elastically fixed at the first fixed jib 14 such that no rotary movement of the inner vane 16 relative to the first fixed jib 14 under an external force is made but the inner vane 16 is bent and resilient after removal of the external force. In this embodiment, the inner vane 16 is made of an elastic material and has a first side 36 connected to the first fixed jib 14 and a second side 38 kept away from the first fixed jib 14. The first side 36 of each inner vane 16 is engaged in the groove 32 in the first fixed jib 14 and stays inside an associated pair of clamp portions 34. The inner vane 16 is non-rotationally fixed at the first fixed jib 14 with the pair of clamp portions 34 and the first side 36 of the inner vane 16 penetrated by fasteners 40 (for example, screws).

Each second fixed jib 18 is mounted on the second end 30 of one of the first fixed jibs 14 and arranged according to the axial direction of the shaft 24. In this embodiment, each second fixed jib 18 extends in a longitudinal direction parallel to the axial direction of the shaft 24. Each second fixed jib 18 is a cylindrical pole made of a rigid material and similar to the first fixed jib 14 structurally. An outer surface of each second fixed jib 18 is provided with a groove 42 and two pairs of clamp portions 44 spaced from each other for the outer vane 20 to be combined. The groove 42 extends in a lengthwise direction of the second fixed jib 18 (the longitudinal direction mentioned previously). Each pair of clamp portions 44 protrudes outwardly from the outer surface of the second fixed jib 18 and are separated by the groove 42.

In this embodiment, two spaced outer vanes 20 are mounted on each second fixed jib 18, and each of the outer vanes 20 is elastically fixed at the second fixed jib 18 such that no rotary movement of the outer vane 20 relative to the second fixed jib 18 under an external force is made but the outer vane 20 is bent and resilient after removal of the external force. In this embodiment, each outer vane 20 similar to the inner vane 16 structurally is made of an elastic material. The outer vane 20 extending in the longitudinal direction has a first side 46 connected to the second fixed jib 18 and a second side 48 kept away from the second fixed jib 18. The first side 46 of the outer vane 20 is engaged in the groove 42 in the second fixed jib 18 and stays inside an associated pair of clamp portions 44. The outer vane 20 is non-rotationally fixed on the second fixed jib 18 with the pair of clamp portions 44 and the first side 46 of the outer vane 20 penetrated by fasteners 50 (for example, screws).

Figure 4:
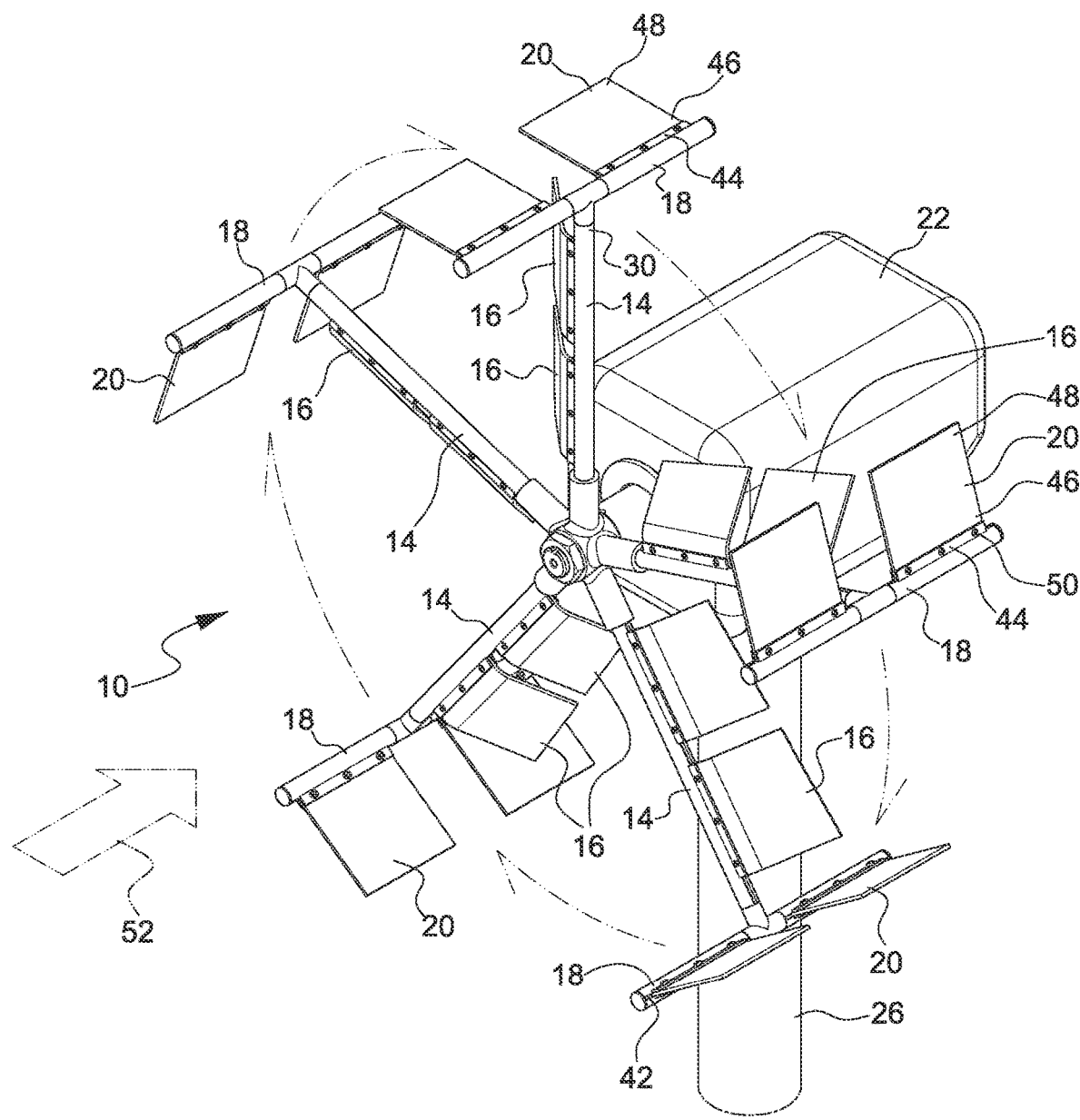
FIG. 4 is a schematic view which illustrates the rotor in FIG. 1 rotating when winds act on partial inner vanes of the rotor.
Figure 4A:
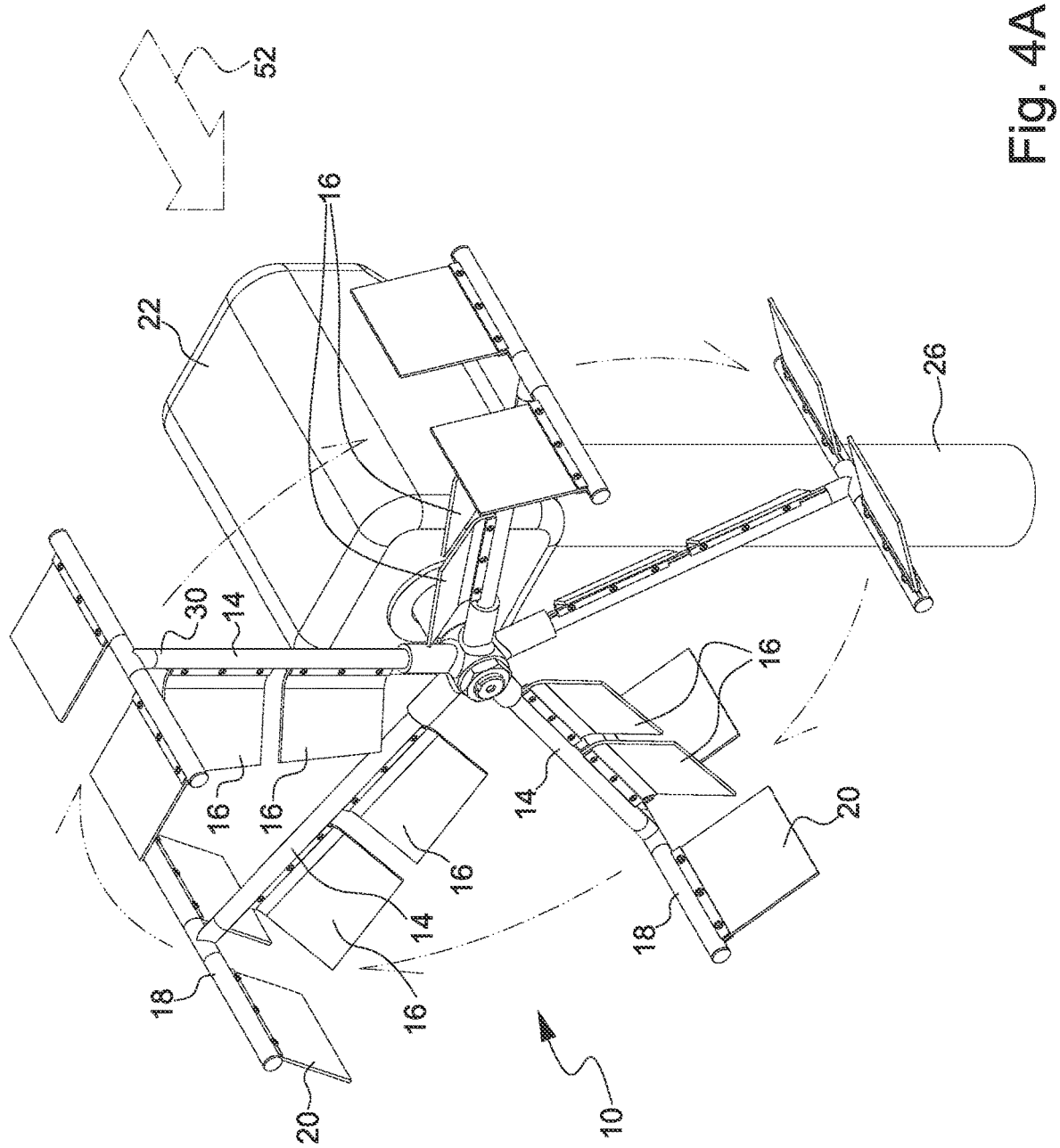
FIG. 4A is a schematic view similar to FIG. 4, illustrating winds in FIG. 4 blowing to the rotor from the opposite direction.
Figure 5:
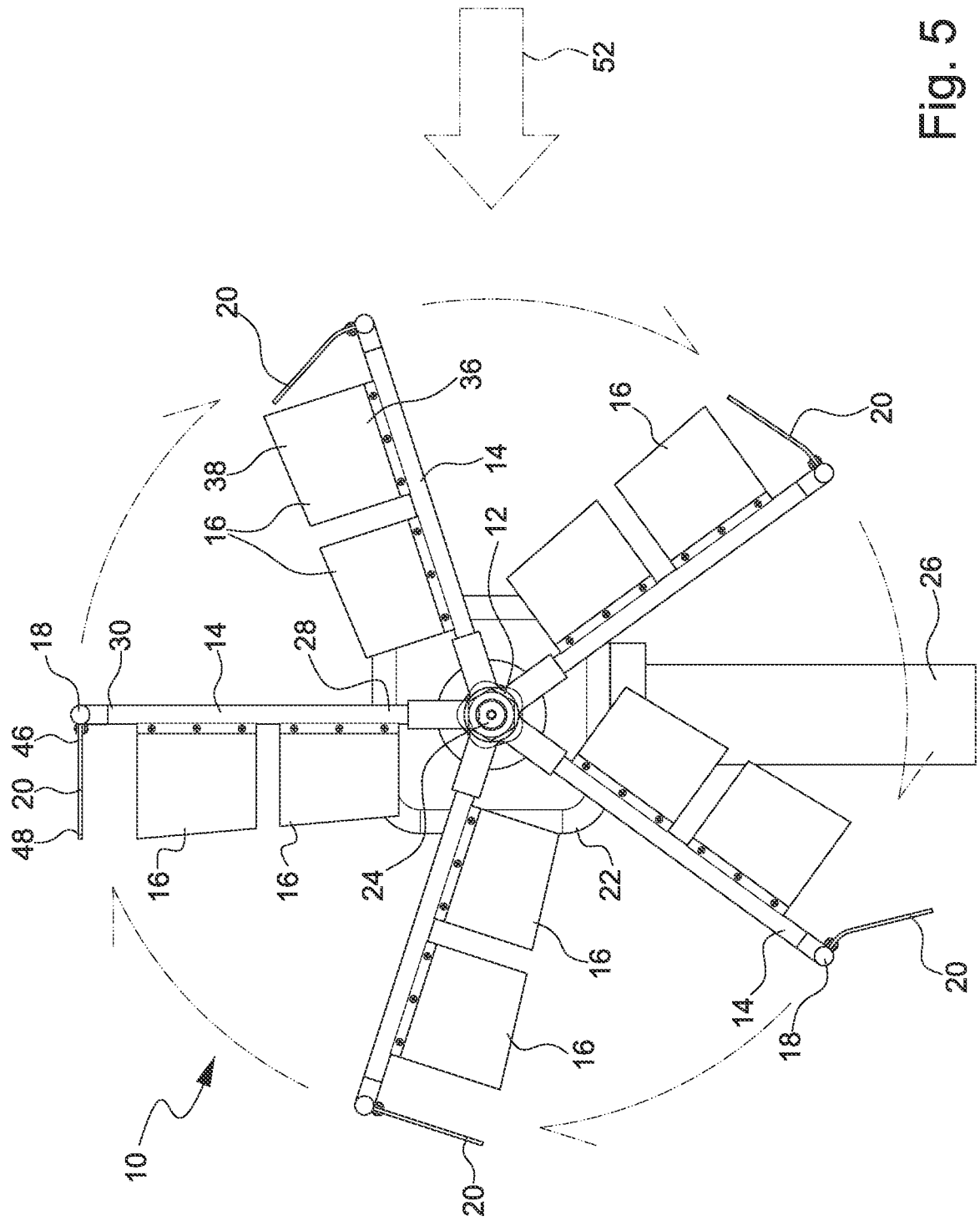
FIG. 5 is a schematic view which illustrates the rotor in FIG. 1 rotating when winds act on partial outer vanes of the rotor.

In practice, the rotor 10 of the present invention can be driven by airflows (winds), water flows or tides. Based on airflows as driving sources, the rotor 10 is erected on the ground. Based on water flows or tides as driving sources, the rotor 10 is immersed in water. In this embodiment as shown in FIG. 4, the rotor 10 relies on airflows as driving sources to run in practice. When winds (air flows) 52 are blown toward the rotor 10 in a direction generally perpendicular or at an angle to the inner vanes 16, at least partial inner vanes 16 will be bent relative to the first fixed jibs 14 under action of winds 52 to create resistance to winds and hence to drive the first fixed jibs 14, so that the rotor 10 is rotated about the shaft 24 clockwise (as shown in dash lines in FIG. 4, a plane of rotation for the first fixed jibs 14 is defined by the circular dash lines in FIG. 4 and perpendicular to the axial direction of the shaft 24) to drive the shaft 24, thereby transmitting wind energy to a power generation system in the electric generator 22 to generate electricity. In contrast, when winds 52 in FIG. 4 blowing reversely to the rotor 10 (as shown in FIG. 4A), at least partial inner vanes 16 are also subjected to the wind force to cause the inner vanes 16 to bend relative to the first fixed jib 14, making the rotor 10 rotated clockwise to drive the shaft 24. Thus, the inner vanes 16 on which external forces act are elastically movable relative to the first fixed jibs 14 to drive the first fixed jibs 14 to rotate along a single rotational direction on the plane of rotation and can rebound after removal of the external forces. On the other hand, as shown in FIG. 5, bending deflections of at least partial outer vanes 20 relative to the second fixed jibs 18 under action of winds 52 blown to the outer vanes 20 of the rotor 10 perpendicularly or at any angle make the rotor 10 rotated clockwise (as shown in dash lines in FIG. 5) and drive the shaft 24, thereby transmitting wind energy to the power generation system in the electric generator 22 to generate electricity. Accordingly, the rotor 10 can be driven to rotate for electricity generation from wind energy effectively with winds 52 in different directions acting on at least partial inner vanes 16 and/or outer vanes 20.

FIG. 5 shows that the hub 12 and shaft 24 rotate together in a single rotational direction (clockwise direction), and the outer vane 20 extends in a direction different from the single rotation direction when not acted upon by external forces. In the present invention, the vanes (inner and outer vanes 16 and 20) of the rotor 10 are elastically fixed on the fixed jibs (first and second fixed jibs 14 and 18). Since the vanes 16, 20 are not rotated relative to the fixed jibs 14, 18 when subjected to the wind force, and can return to the original fixed position after removal of the wind force, there is no need to additionally install the prior art barrier members with which vanes are rotated within certain angles for simplifying structure and assembly of the rotor 10. Moreover, since the inner and outer vanes 16 and 20 do not rotate relative to the first and second fixed jibs 14 and 18, the wear problem caused by the rotation can be improved, and thus the service lives of the inner and outer vanes 16 and 20 can be effectively improved.

Figure 6:
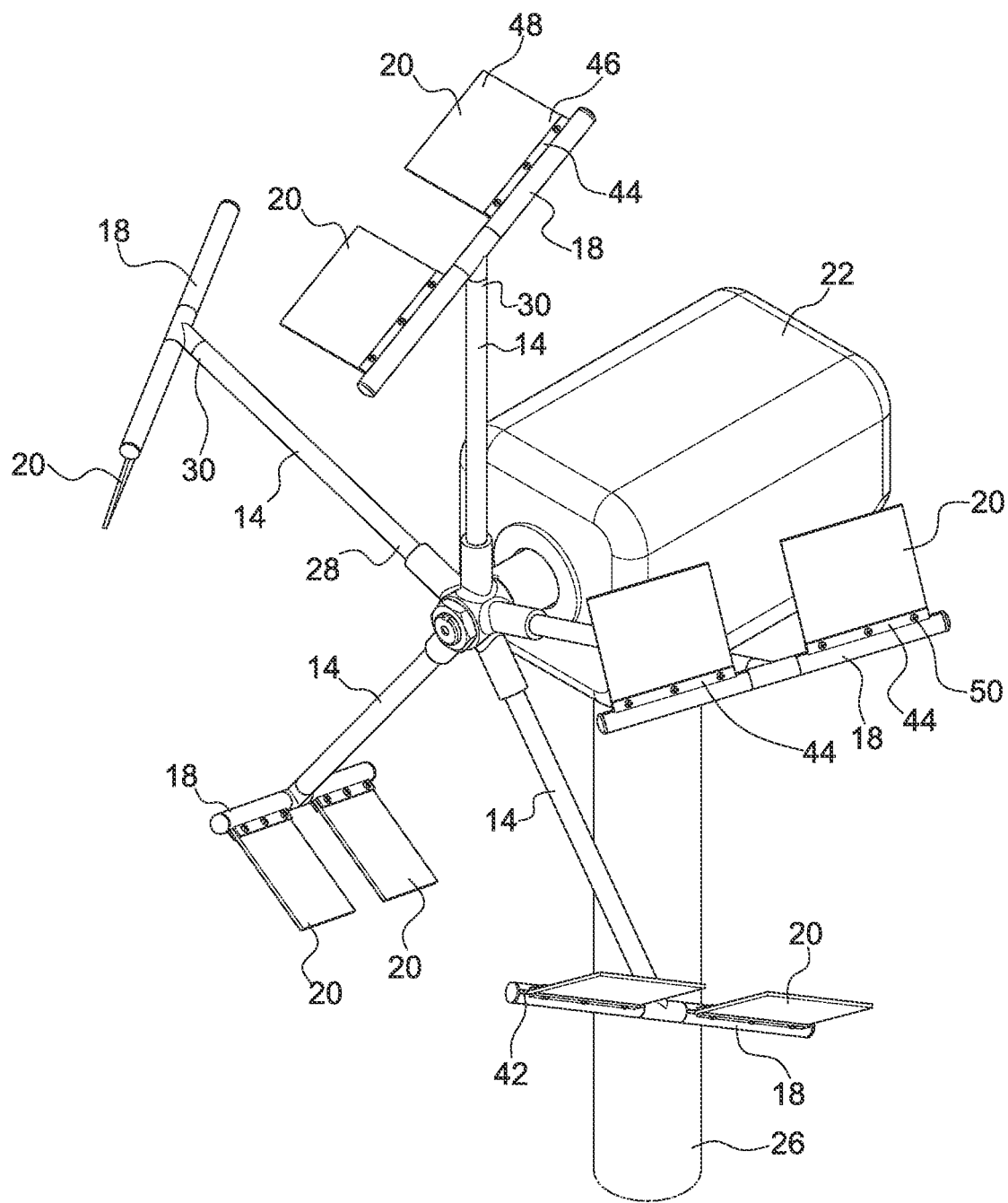
FIG. 6 is a perspective view similar to FIG. 1, illustrating a rotor in accordance with a second embodiment of the present invention.
Figure 7:
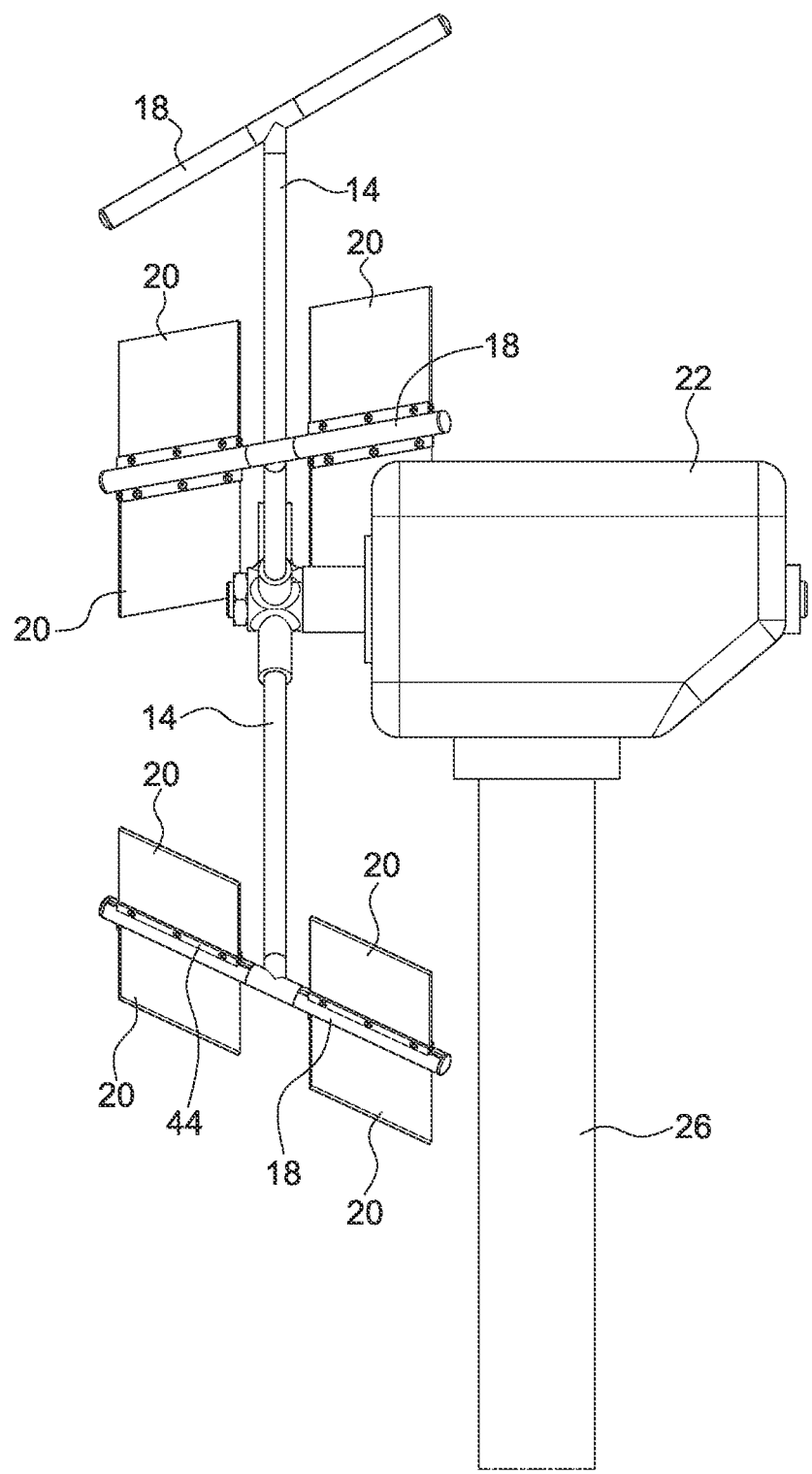
FIG. 7 is a plane view of the rotor and the electric generator in FIG. 6.

FIGS. 6 and 7 illustrate a rotor 10 in a second embodiment of the present invention. In this embodiment, the extending direction of the second fixed jib 18 is not substantially parallel to the axial direction of the shaft 24, but is at an angle with respect to the axial direction of the shaft 24. The outer vane 20 extends in a direction tilt but not perpendicular to the radial direction of the shaft 24.

Figure 8:
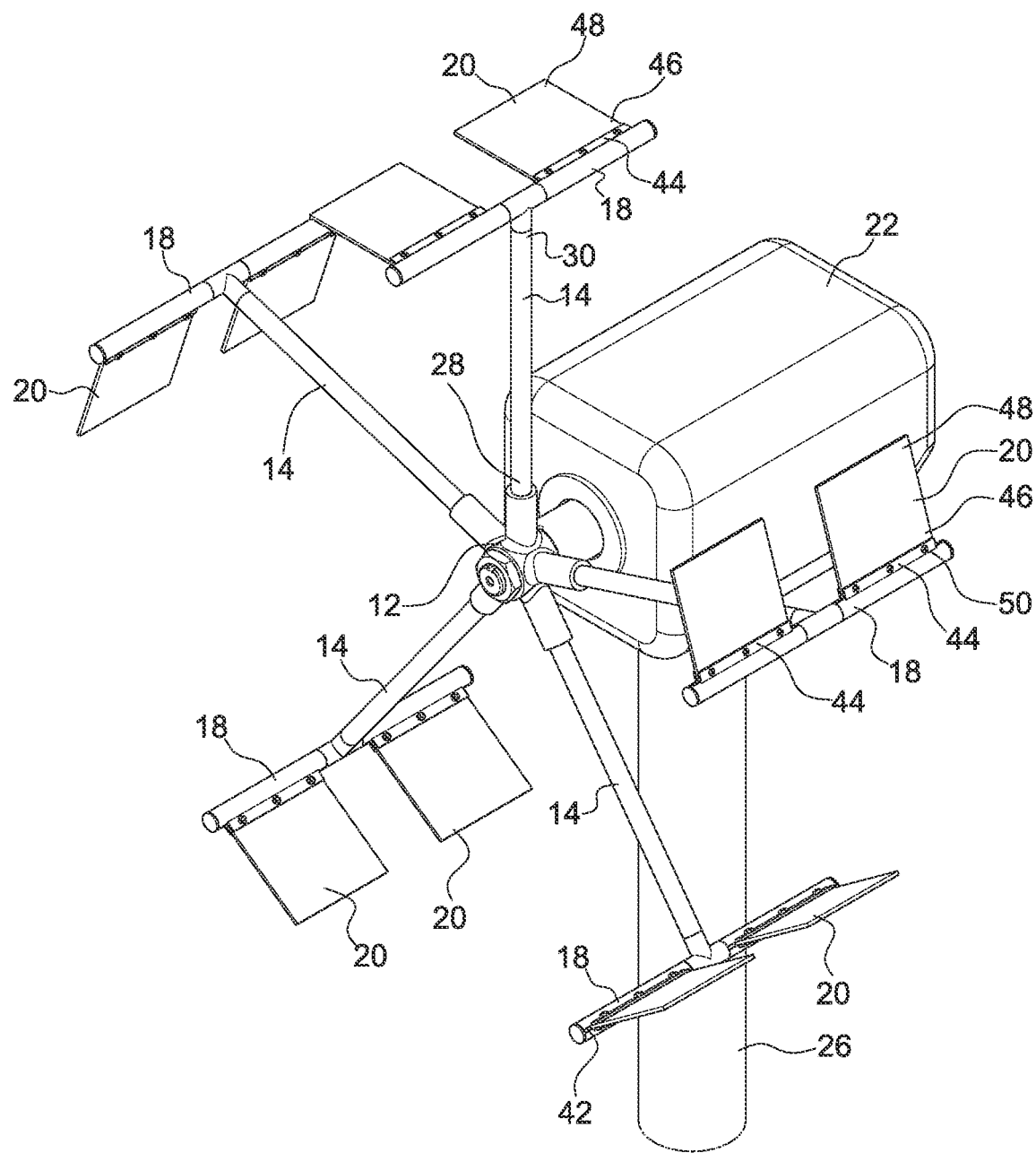
FIG. 8 is a perspective view similar to FIG. 1, illustrating a rotor in accordance with a third embodiment of the present invention.

FIG. 8 illustrates a rotor 10 in a third embodiment of the present invention. The rotor 10 in FIG. 8 is not provided with the inner vanes 16.

Figure 9:
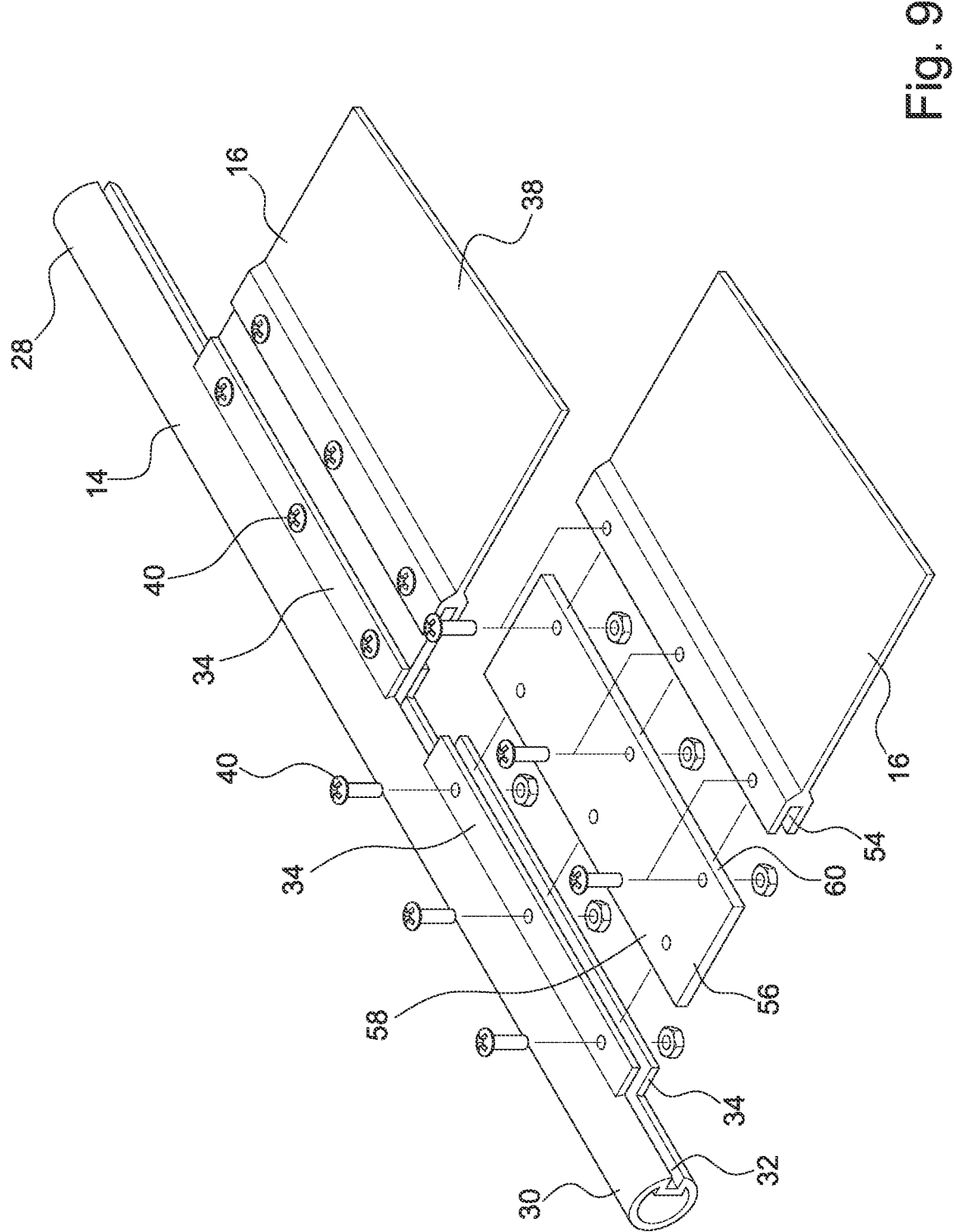
FIG. 9 is a perspective view similar to FIG. 3, illustrating a fixed jib and vanes in another embodiment of the present invention.
Figure 10:
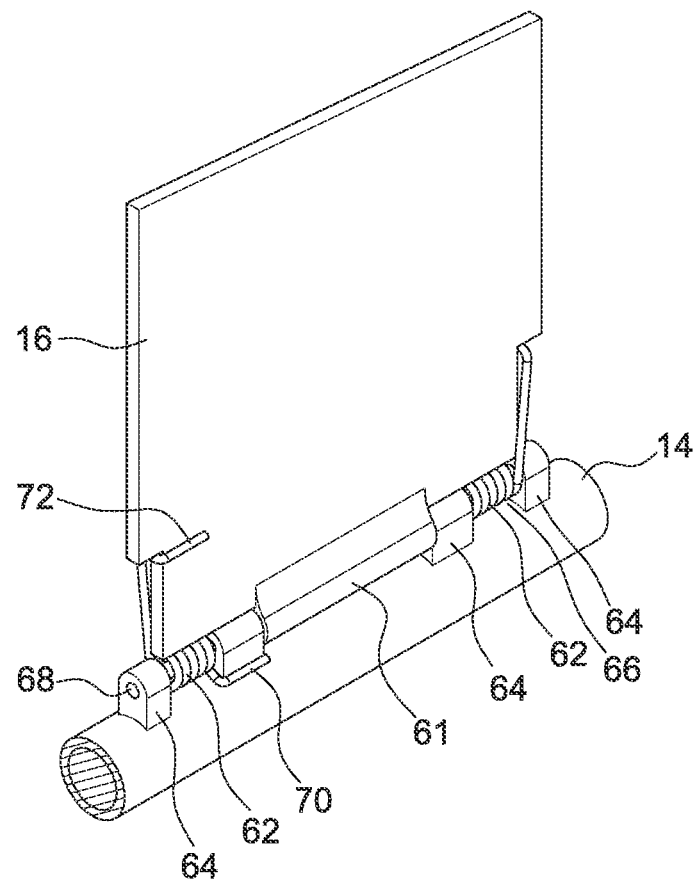
FIG. 10 is a perspective view which illustrates a fixed jib and vanes in a further embodiment of the present invention.

The fixed jibs (the first and second fixed jibs 14 and 18) and the vanes (the inner and outer vanes 16 and 20) of the present invention are further demonstrated in other feasible embodiments as shown in FIGS. 9 and 10. In this embodiment as shown in FIG. 9, the inner vane 16 (or the outer vane 20) is made of a rigid material and has a slot 54 in one end thereof. Moreover, an elastic connecting member 56 is installed between the inner vane 16 and the first fixed jib 14 and has an internal end 58 and an external end 60. The internal end 58 is engaged in the groove 32 of the first fixed jib 14 and fastened with fasteners 40 (for example, screws), and the external end 60 is engaged in the slot 54 of the inner vane 16 and fastened with fasteners 40 (for example, screws). In virtue of the elastic connecting member 56, the inner vane 16 is elastically fixed at the first fixed jib 14 and can be swung or tilted at an angle (not shown) relative to the first fixed jib 14 under action of an external force which induces no rotary movement of the inner vane 16 relative to the first fixed jib 14.

In this embodiment of FIG. 10, the inner vane 16 (or the outer vane 20) is made of a rigid material, and a connective portion 61 is designed at one side of the inner vane 16. Two springs 62 are installed between the inner vane 16 and the first fixed jib 14. Two pairs of lugs 64 are designed on and protrude outward from an outer surface of the first fixed jib 14 (or the second fixed jib 18), and an accommodation space 66 is defined between each pair of lugs 64 for receiving one of the springs 62. The two pair of lugs 64, the springs 62 and the connective portion 61 of the inner vane 16 are penetrated by an axle 68 such that two ends 70, 72 of each spring 62 abut against the first fixed jib 14 and the inner vane 16, respectively. Thus, the inner vanes 16 can swing relative to the first fixed jibs 14 with one of the two springs 62 providing the inner vane 16 with elastic recovery in a first swing direction perpendicular to the plane of rotation, and with the other of the two springs 62 providing the inner vane 16 with elastic recovery in a second swing direction opposite to the first swing direction. Accordingly, when an external force is applied on the inner vane 16 (or the outer vane 20) elastically fixed on the first fixed jib 14 (or the second fixed jib 18), no rotary movement of the inner vane 16 (or the outer vane 20) relative to the first fixed jib 14 (or the second fixed jib 18) is made but the inner vane 16 (or the outer vane 20) will swing an angle and can return to the original state when the external force is removed.

Figure 11:
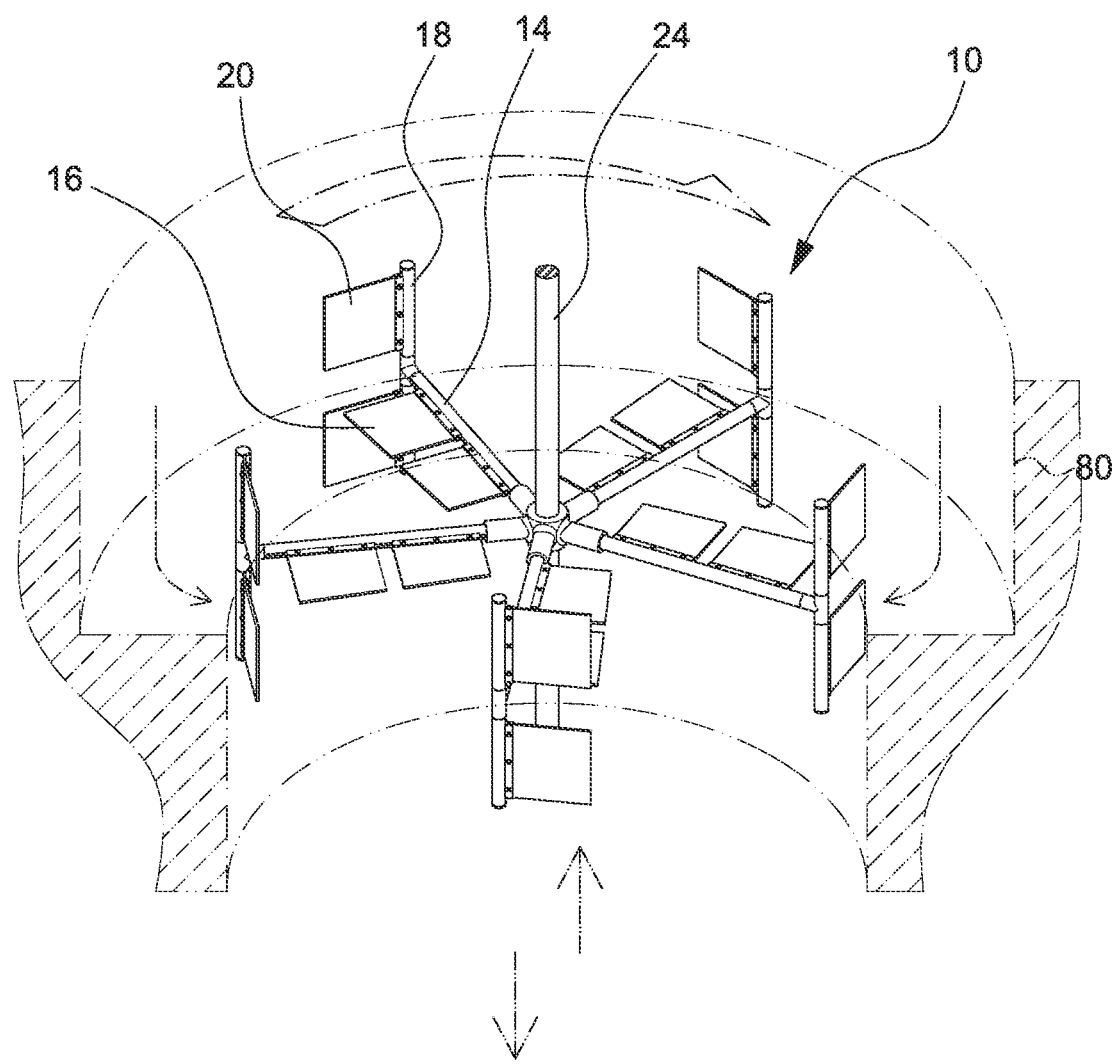
FIG. 11 is a schematic view which illustrates the rotor of an embodiment of the present invention installed in a longitudinally arranged water channel.

FIG. 11 shows an embodiment of the rotor 10 relying on water flows or tides as driving sources to run in practice. In this embodiment, the rotor 10 of the present invention is installed in a longitudinally arranged water channel 80, which provides a passage for water and sea water and includes a height difference. The shaft 24 extends in a height direction of the water channel 80. When water flows from a high place to a low place in the water channel 80, no matter whether the flow rate is fast or slow, at least partial inner vanes 16 and outer vanes 20 will be bent under action of the fluid and hence to drive the rotor 10 to rotate in a regular direction, which in turn rotates the shaft 24 to drive an electric generator to generate electricity. Regarding the implementation of ocean waves (wave energy), the fluctuation of the ocean waves can cause the seawater in the water channel 80 to generate wave energy of continuous water level difference, and the inner and outer vanes 16 and 20 of the rotor 10 will be subjected to the wave energy to produce continuous bending and swinging between the forward and reverse directions like a fish tail fin, so that the rotor 10 rotates in a regular direction, and the shaft 24 turns together to drive an electric generator to convert electrical energy. It is understandable that the water channel 80 may have a change in the aperture at the implementation position of the rotor 10, so that in addition to the longitudinal implementation, the water flows can also generate a transverse traction flow, thereby facilitating the bending of the inner and outer vanes 16 and 20. In addition, the aperture change of the water channel 80 also reduces the bending rate of the inner and outer vanes 16 and 20 under impact, so that the rotor 10 can be driven to rotate more effectively.

Figure 12:
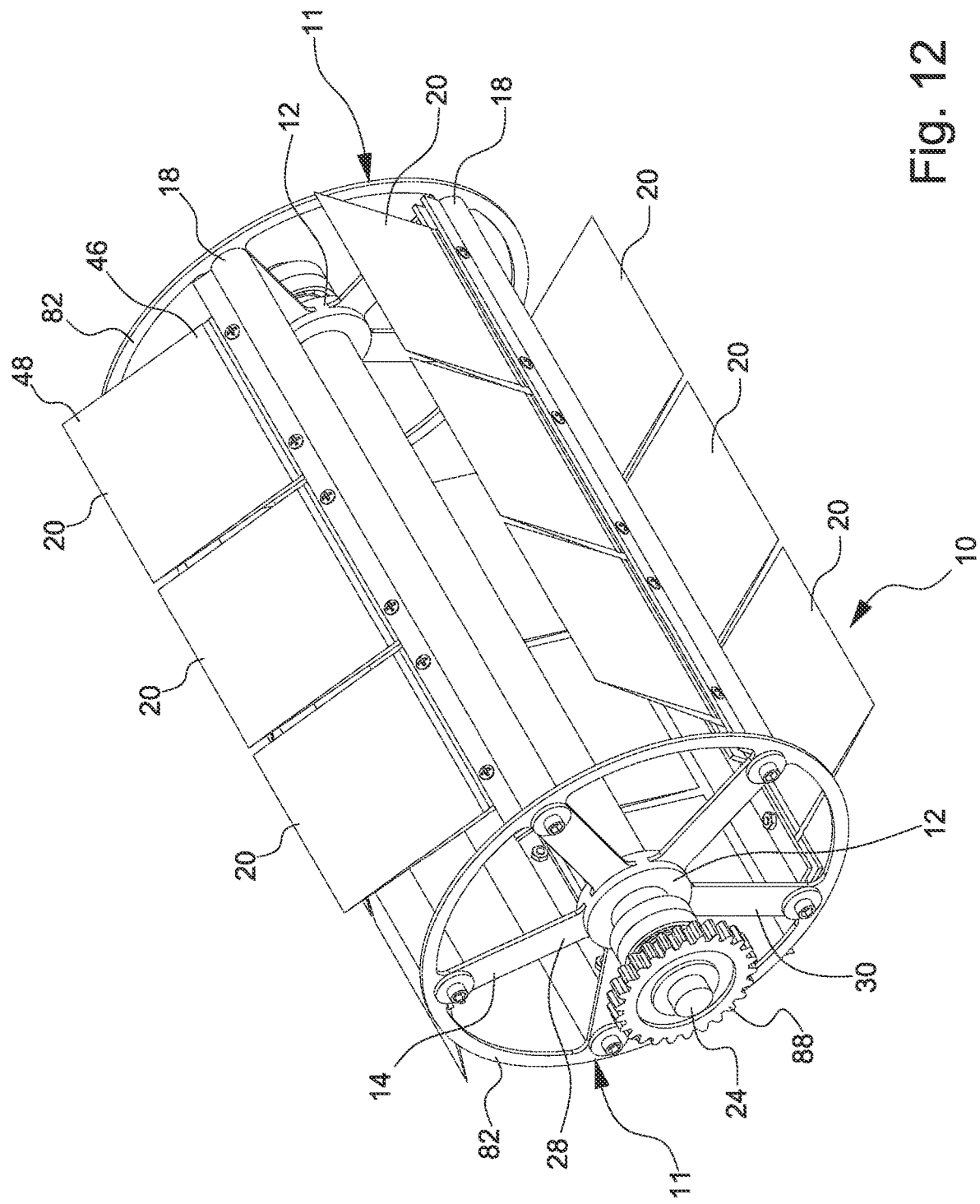
FIG. 12 is a perspective view of a rotor in accordance with another embodiment of the present invention, with the rotor including two spaced hubs assembled with a shaft.
Figure 13:
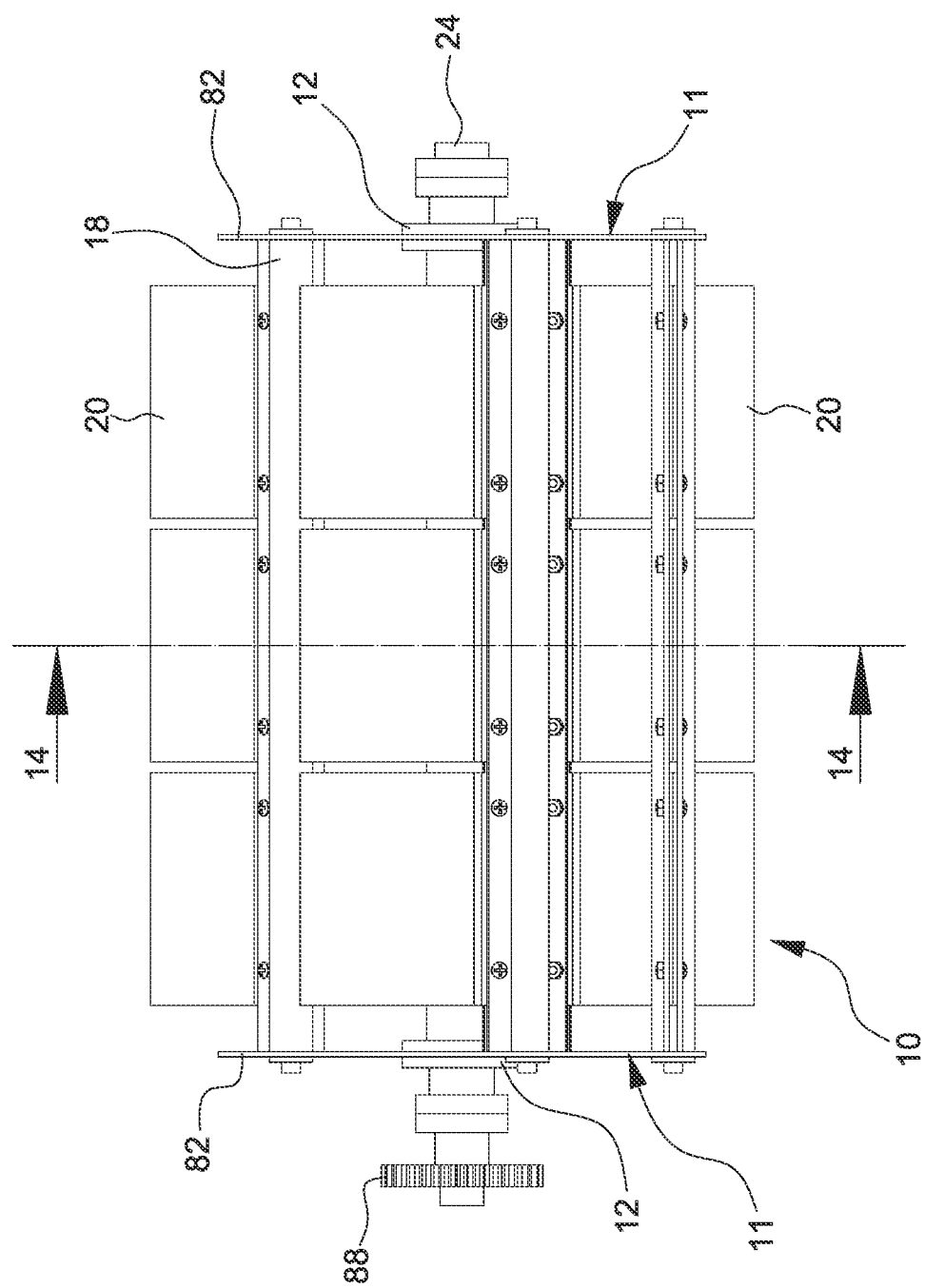
FIG. 13 is a plane view of the rotor in FIG. 12.
Figure 14:
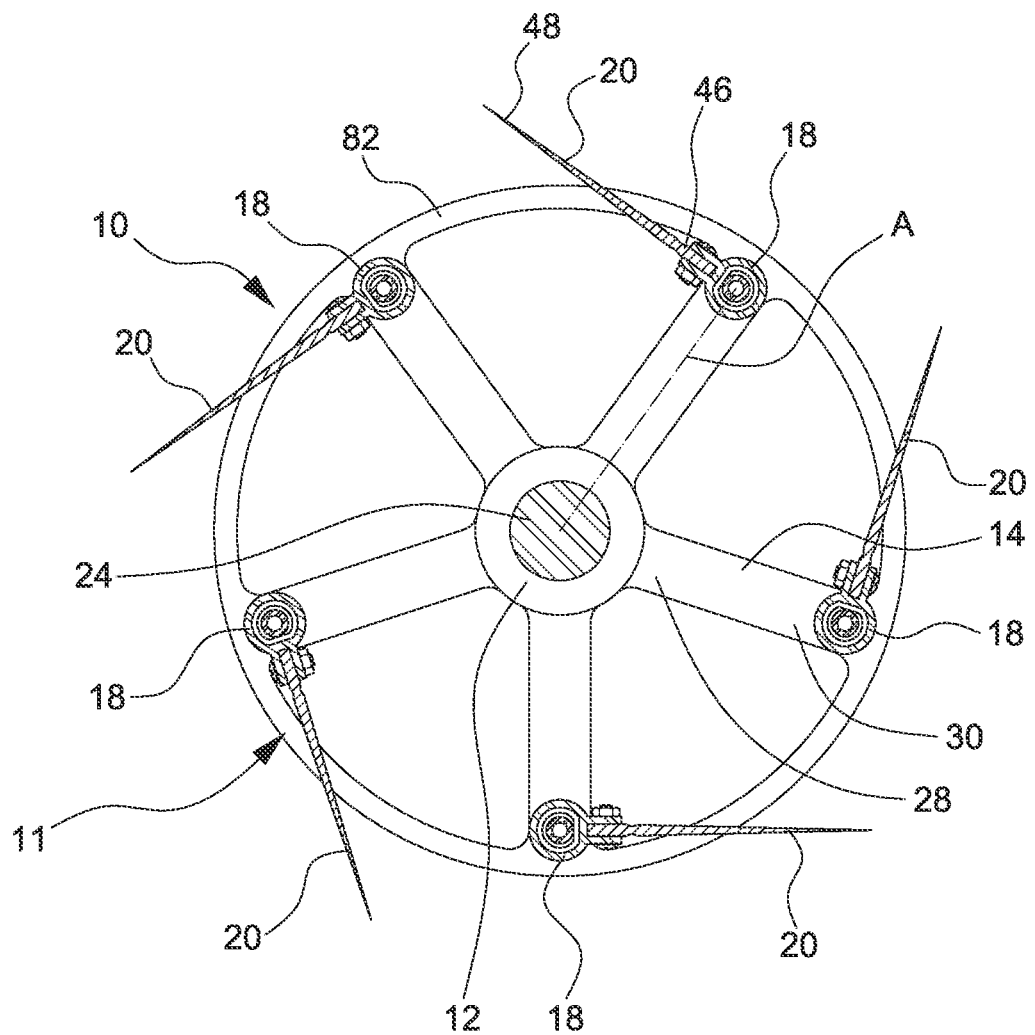
FIG. 14 shows a sectional view taken along line 14-14 in FIG. 13.

FIGS. 12, 13 and 14 illustrate another embodiment of a rotor 10 of the present invention. In this embodiment, the rotor includes two horizontally spaced hubs 12, a plurality of second fixed jibs 18, and at least one outer vane 20 mounted on each second fixed jib 18. The two hubs 12 are adapted to be coupled with a shaft 24 which extends through the hubs 12 to rotate together in a single rotational direction, A plurality of first fixed jibs 14 is installed around each hub 12. In this embodiment, five first fixed jibs (radial spokes) 14 are provided around each hub 12 and spaced apart along a circumferential direction of the hub 12. Each first fixed jib 14 extends in a radial direction perpendicular to an axial direction of the shaft 24 and includes a first end 28 connected to a corresponding hub 12 and a second end 30 kept away from the corresponding hub 12. A ring 82 is combined with the second ends 30 of the first fixed jibs 14 of each hub 12 to form a bracket 11, so that the rotor 10 forms a drum-shaped configuration. In this embodiment, five second fixed jibs 18 are fixedly combined between the two brackets 11 and equiangularly distributed around the shaft 24. Each second fixed jib 18 extends in a direction parallel to the axial direction of the shaft 24 and is installed between two opposing first fixed jibs 14 of the two hubs 12. In feasible embodiments, each second fixed jib 18 extends in a direction which is at an angle with respect to the axial direction of the shaft 24.

In this embodiment, three spaced outer vanes 20 are mounted on each second fixed jib 18, and each of the outer vanes 20 is elastically fixed at the second fixed jib 18 such that no rotary movement of the outer vane 20 relative to the second fixed jib 18 under an external force is made but the outer vane 20 is bent and resilient after removal of the external force. In this embodiment, each outer vane 20 is made of an elastic material. Referring to FIG. 14, the outer vane 20 has a first side 46 connected to the second fixed jib 18 and a second side 48 kept away from the second fixed jib 18. Each outer vane 20 is arranged at the counterclockwise end or the clockwise end of the rotation path of the second fixed jib 18 and is non-rotationally fixed at the second fixed jib 18. A reference plane A is formed between the second fixed jib 18 and the axis of the shaft 24, and each outer vane 20 is approximately perpendicular to the reference plane A.

Figure 15:
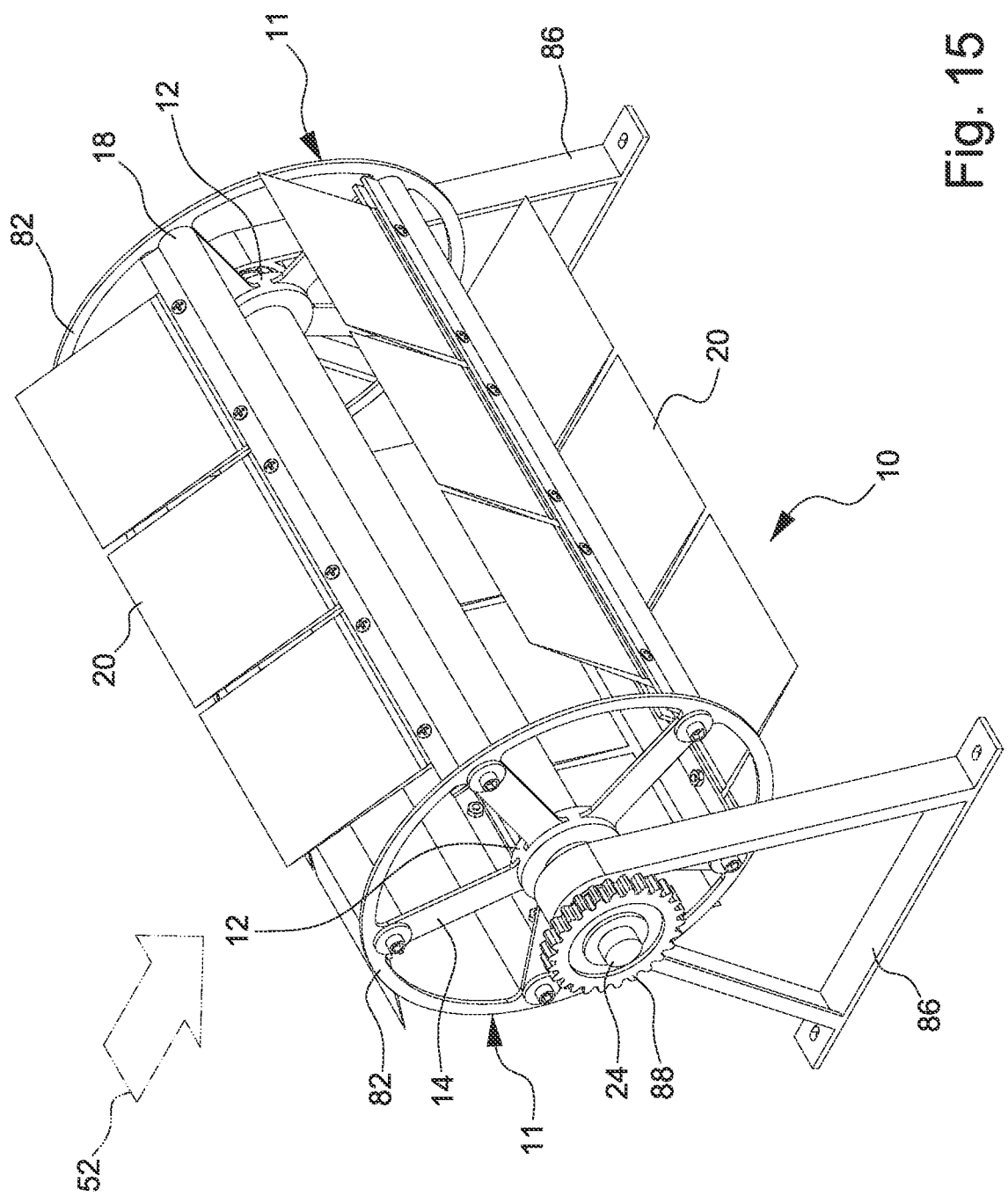
FIG. 15 shows a schematic view which illustrates the rotor in FIG. 12 used for air flow implementation.
Figure 16:
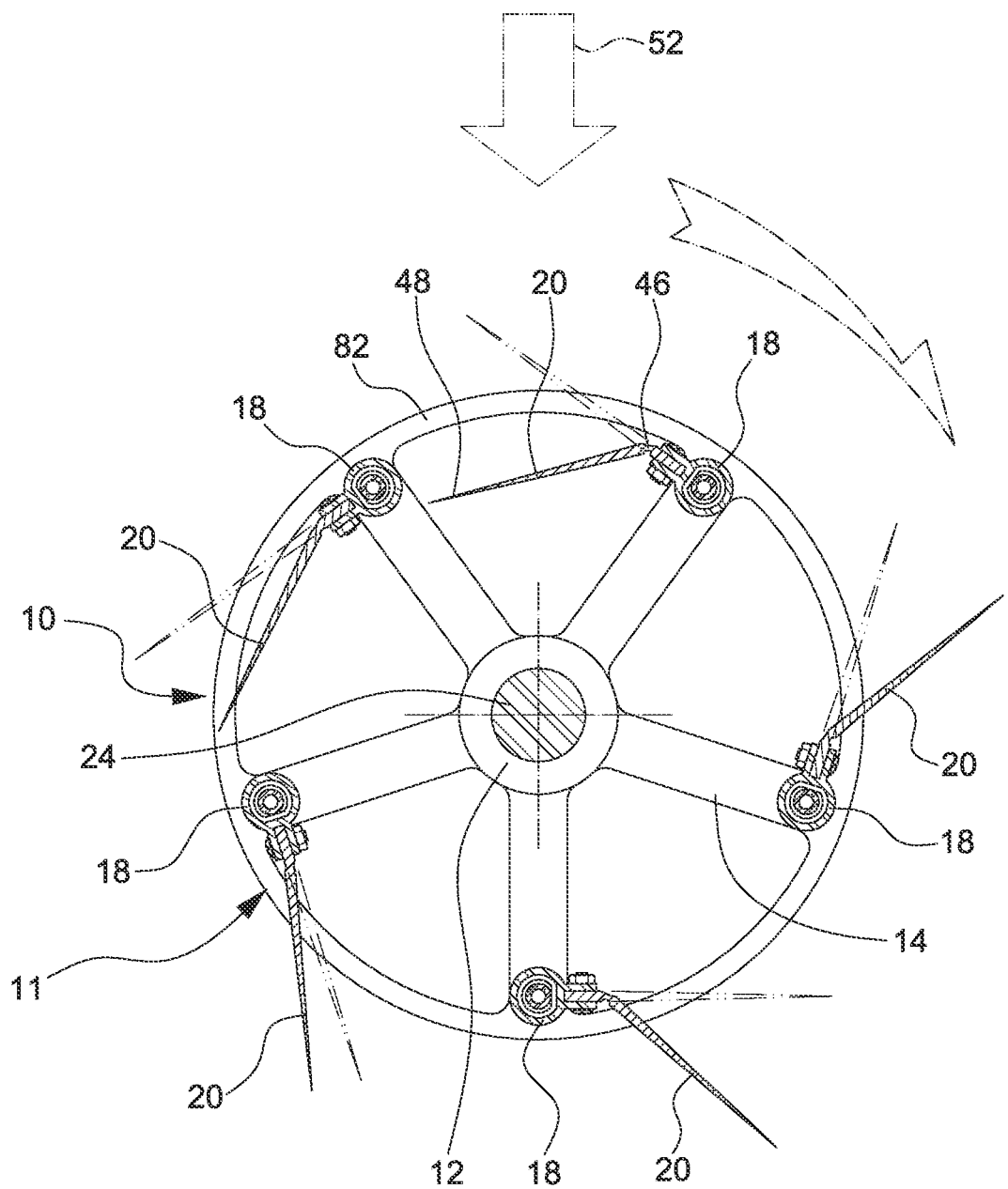
FIG. 16 is a schematic view which illustrates the rotor in FIG. 15 rotating when winds act on partial outer vanes of the rotor.

Referring to FIG. 15, in an embodiment, the shaft 24 is pivotally mounted on a base formed by two spaced support frames 86, and a transmission member 88 such as a gear, a pulley, a sprocket, etc. is installed on the shaft 24, so that the rotational kinetic energy generated by shaft 24 can be transmitted to an electric generator. As shown in FIG. 16, when winds (air flows) 52 are blown toward the rotor 10 in a direction generally perpendicular or at an angle to the outer vanes 20, at least partial outer vanes 20 will be bent relative to the second fixed jibs 18 under action of winds 52 to create resistance to winds and hence to drive the second fixed jibs 18, so that the rotor 10 is rotated about the shaft 24 clockwise to drive the shaft 24, thereby transmitting wind enemy to a power generation system in an electric generator. In contrast, when winds 52 in FIG. 16 blowing reversely to the rotor 10, at least partial outer vanes 20 are also subjected to the wind force to cause the outer vanes 20 to bend relative to the second fixed jibs 18, making the rotor 10 rotated clockwise to drive the shaft 24. Thus, the outer vanes 20 on which external forces act are elastically movable relative to the second fixed jibs 18 to drive the second fixed jibs 18 to rotate along a single rotational direction and can rebound after removal of the external forces. Furthermore, the rotor 10 can be driven to rotate for electricity generation from wind energy effectively with winds 52 in different directions acting on at least partial outer vanes 20.

FIG. 16 shows that the hub 12 and shaft 24 rotate together in a single rotational direction (clockwise direction), and the outer vane 20 extends in a direction different from the single rotation direction when not acted upon by external forces.

Figure 17:
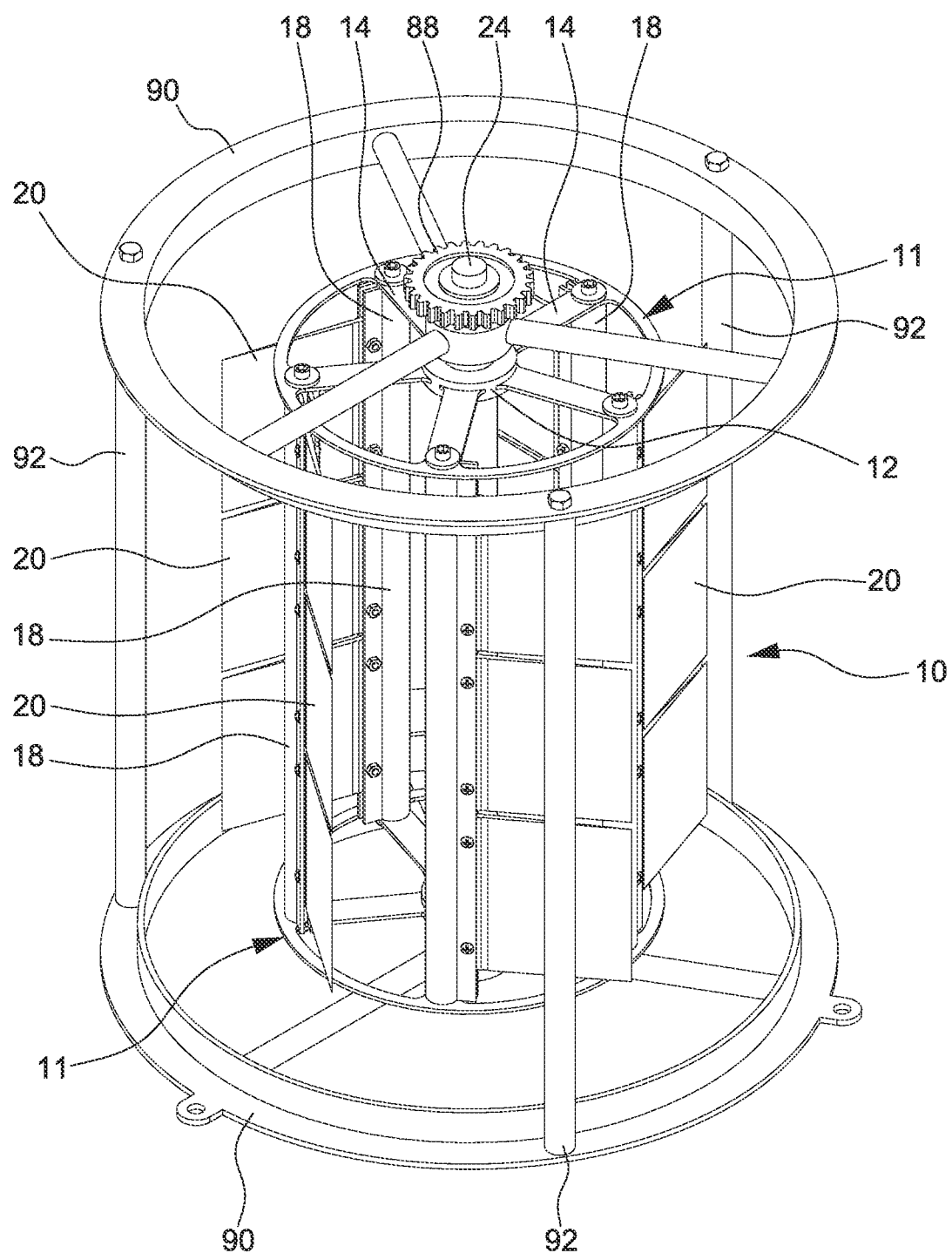
FIG. 17 shows a schematic view which illustrates the rotor in FIG. 12 used for water flow implementation.
Figure 18:
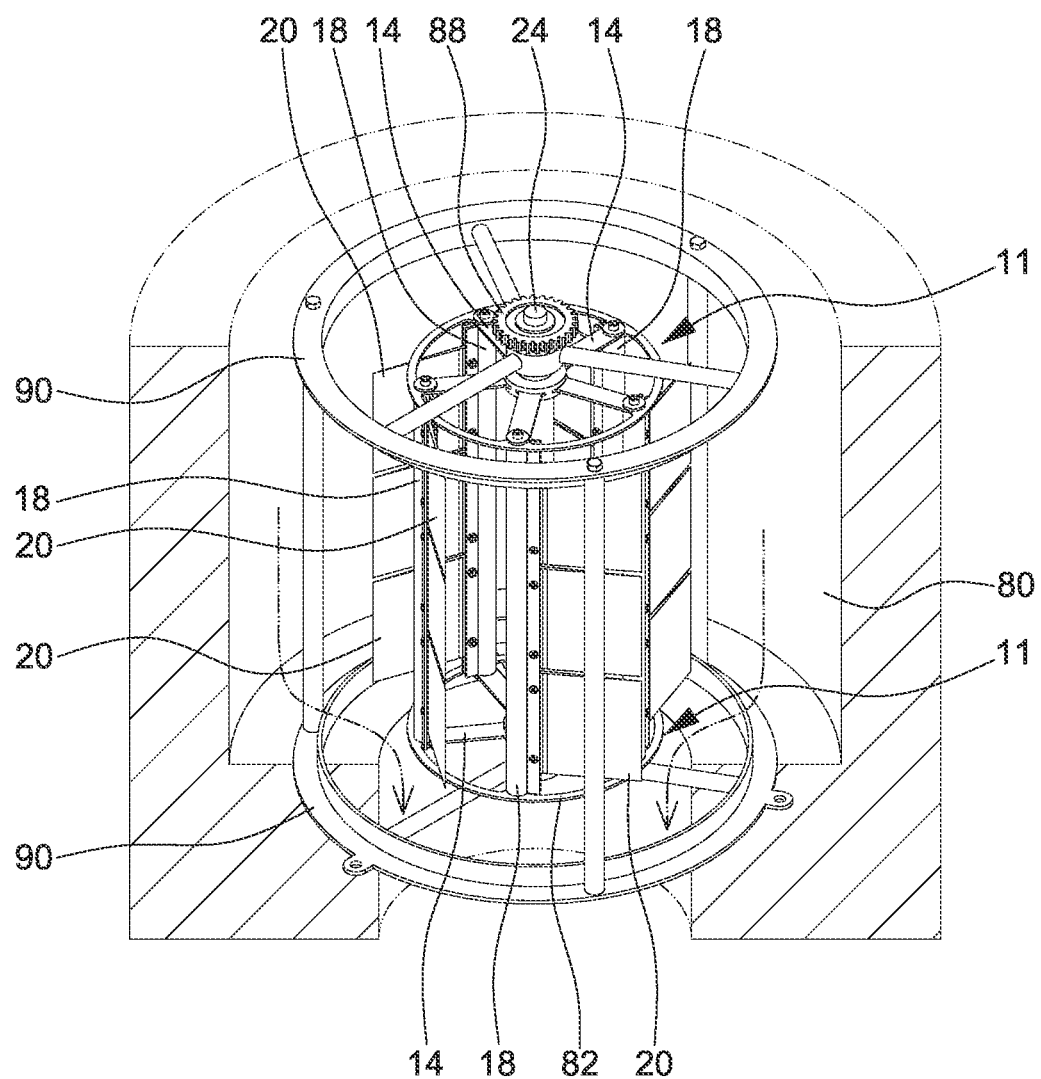
FIG. 18 shows a schematic view of the rotor of FIG. 17 installed in a water channel.

Referring to FIG. 17, in an embodiment, the shaft 24 is pivotally mounted on a base formed by two spaced supporting rings 90, and the support rings 90 are combined by a plurality of connecting rods 92, FIG. 18 shows an embodiment of the rotor 10 of FIG. 17 relying on water flows or tides as driving sources to run in practice. The rotor 10 is installed in a longitudinally arranged water channel 80, which provides a passage for water and sea water and includes a height difference. When water flows from a high place to a low place in the water channel 80, no matter whether the flow rate is fast or slow, at least partial outer vanes 20 will be bent under action of the fluid and hence to drive the rotor 10 to rotate in a regular direction, which in turn rotates the shaft 24 to drive an electric generator to generate electricity, it is understandable that the vertically arranged rotor 10 shown in FIG. 17 can also be used in an implementation environment where wind is used as a driving source. Thus, the implementation status of the rotor 10 of the present invention is more diversified.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

The invention claimed is:
1. A rotor for power driving comprising:
 a hub adapted to be coupled with a shaft to rotate together in a single rotational direction;

a plurality of first fixed jibs installed around the hub circumferentially and spaced from one another, with each of the plurality of first fixed jibs including a first end connected to the hub and a second end kept away from the hub;

a plurality of second fixed jibs each engaged on the second end of one of the plurality of first fixed jibs and arranged according to an axial direction of the shaft; and a plurality of outer vanes each elastically fixed at a corresponding second fixed jib and extending outwardly from an outer surface of the corresponding second fixed jib in a direction different from the single rotational direction, each outer vane extending perpendicular to a radial direction of the shaft in a first position when not acted upon by external forces, and wherein when each outer vane is acted upon by the external forces, each outer vane does not rotate and is elastically bent unrestrictedly relative to the corresponding second fixed jib from the first position inward towards the hub to a second position or outward away from the hub to a third position, to drive the shaft to rotate along the single rotational direction and each outer vane can elastically rebound to the first position from the second or third position after removal of the external forces.

2. The rotor for power driving as claimed in claim 1, wherein the outer vane is made of an elastic material and has one side connected to the corresponding second fixed jib such that the plurality of outer vanes on which the external forces act make no rotary movement relative to the plurality of second fixed jibs but are bent.

3. The rotor for power driving as claimed in claim 1, wherein the outer vane is made of a rigid material and an elastic connecting member is installed between the outer vane and the corresponding second fixed jib, with the elastic connecting member having an internal end connected to the corresponding second fixed jib and an external end connected to the outer vane.

4. The rotor for power driving as claimed in claim 1, wherein each second fixed jib extends in a direction parallel to the axial direction of the shaft.

5. A rotor for power driving comprising:
two spaced hubs adapted to be coupled with a shaft to rotate together in a single rotational direction, wherein the shaft extends through the two hubs;

a plurality of first fixed jibs installed around each hub circumferentially and spaced from one another, with each of the plurality of first fixed jibs including a first end connected to a corresponding hub and a second end kept away from the corresponding hub;

a plurality of second fixed jibs each fixedly combined between two opposing first fixed jibs of the two hubs; and a plurality of outer vanes each elastically fixed at a corresponding second fixed jib and extending outwardly from an outer surface of the corresponding second fixed jib in a direction different from the single rotational direction, each outer vane extending perpendicular to a radial direction of the shaft in a first position when not acted upon by external forces, and wherein when each outer vane is acted upon by the external forces, each outer vane does not rotate and is elastically bent unrestrictedly relative to the corresponding second fixed jib from the first position inward towards the hub to a second position or outward away from the hub to a third position, to drive the shaft to rotate along the single rotational direction and each outer vane can elastically rebound to the first position from the second or third position after removal of the external forces.

6. The rotor for power driving as claimed in claim 5, wherein each second fixed jib extends in a direction parallel to an axial direction of the shaft.

7. The rotor for power driving as claimed in claim 5, wherein a ring is combined with the second ends of the first fixed jibs of each hub to form a bracket, with the plurality of second fixed jibs fixedly combined between the two brackets and equiangularly distributed around the shaft.

8. The rotor for power driving as claimed in claim 5, wherein each outer vane has a first side connected to the corresponding second fixed jib and a second side kept away from the corresponding second fixed jib, wherein a reference plane is formed between the second fixed jib and an axis of the shaft, and each outer vane is approximately perpendicular to the reference plane.

9. The rotor for power driving as claimed in claim 5, wherein the outer vane is made of an elastic material and has one side connected to the corresponding second fixed jib such that the plurality of outer vanes on which the external forces act make no rotary movement relative to the plurality of second fixed jibs but are bent.

10. The rotor for power driving as claimed in claim 5, wherein the outer vane is made of a rigid material and an elastic connecting member is installed between the outer vane and the corresponding second fixed jib, with the elastic connecting member having an internal end connected to the corresponding second fixed jib and an external end connected to the outer vane.

* * * * *